Oct. 4, 1932.  R. H. WARD  1,880,552

DUST FILTER FOR RADIATOR COVERS

Filed Nov. 8, 1929  2 Sheets-Sheet 1

Inventor:
Richard H. Ward
By his Attorneys
Redding, Greeley, O'Shea & Campbell

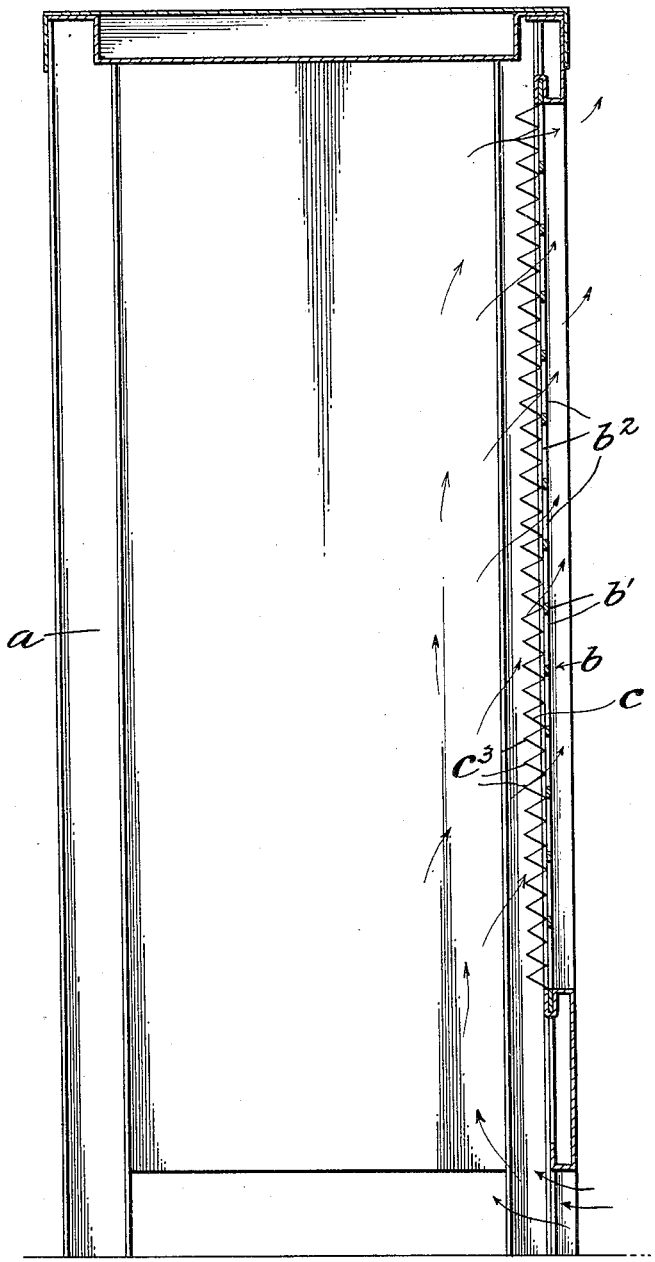
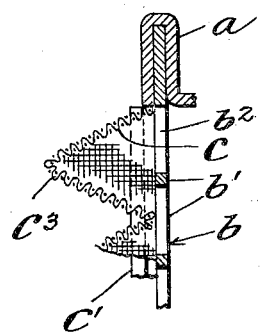

Patented Oct. 4, 1932

1,880,552

UNITED STATES PATENT OFFICE

RICHARD H. WARD, OF QUEENS VILLAGE, NEW YORK, ASSIGNOR TO EDWARD C. BOWERS AND CHARLES L. FELDMAN, RECEIVERS FOR WICKWIRE SPENCER STEEL COMPANY, OF NEW YORK, N. Y., A CORPORATION OF MASSACHUSETTS

DUST FILTER FOR RADIATOR COVERS

Application filed November 8, 1929. Serial No. 405,595.

The present invention relates to radiator covers and embodies, more specifically, an improved cabinet cover for radiators in which means is provided for filtering out the dust which is contained in the current of heated air from the radiator.

Radiator covers of one form or another are well known in the art and the specific cabinet structure of such cover is not involved in the present invention. The objectionable flow of dust from radiators and its soiling of articles adjacent thereto is well known, and previous attempts to eliminate such dust have resulted in failures since the dust screen has impaired the proper functioning of the radiator to which such screen has been applied.

The present invention embodies an improved form of screen for filtering out the dust in the current of air from the radiator, such screen effectively removing substantially all of the dust without impairing the functioning of the radiator. It is contemplated that the screen, or filtering element, will be of such character as to permit ample air to flow through the same, the superficial filtering area being increased substantially over the surface area of the cabinet upon which the filtering element is applied.

An object of the invention, accordingly, is to provide a means for filtering dust from the air flowing from radiator covers.

A further object of the invention is to provide a dust filter for radiator covers in which the superficial area is increased materially over the normal surface area of the cover of the radiator to which the filtering device is applied.

A further object of the invention is to provide a filter which does not impair the functioning of the radiator.

Further objects, not specifically enumerated above, will be apparent as the invention is described in greater detail in connection with the accompanying drawings, wherein:

Figure 4 is a view in section, taken on line 4—4 of Figure 1, and looking in the direction of the arrows.

Figure 5 is an enlarged detail view in transverse section, showing a portion of the filtering device.

Figure 1:
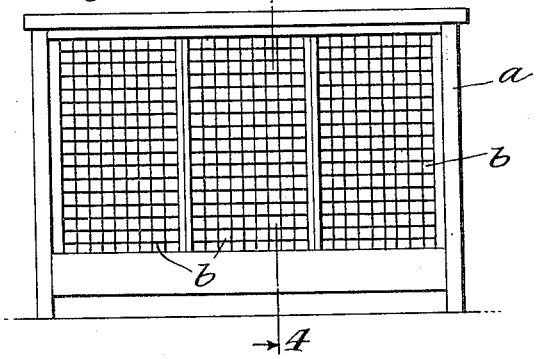
Figure 1 is a view in front elevation, showing a radiator cover to which a dust screen, constructed in accordance with the present invention, may be applied.
Figure 2:
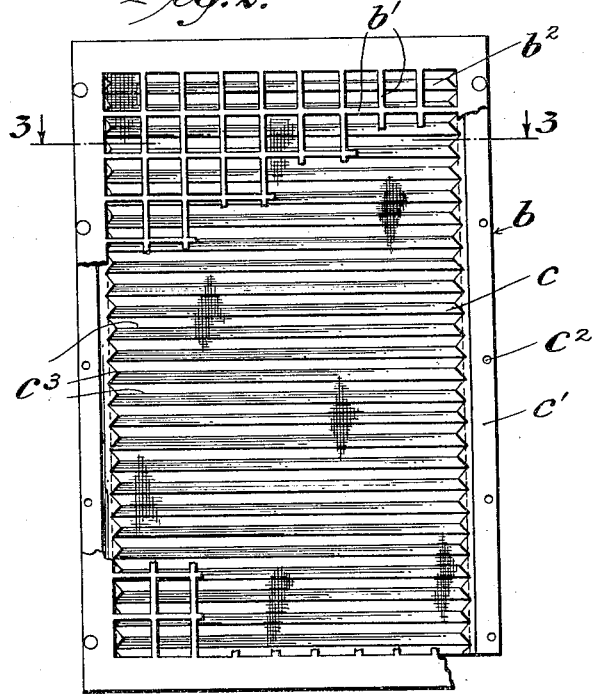
Figure 2 is a view in front elevation, partly broken away, showing a grating section of the radiator cover to which a dust screen, constructed in accordance with the present invention, has been applied.
Figure 3:
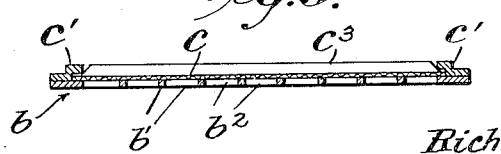
Figure 3 is a view in section, taken on line 3—3 of Figure 2, and looking in the direction of the arrows.

Referring to the above drawings, a radiator cover is shown at $a$, having any desired number of front panels $b$. These panels may be formed with grating of any desired character, in the present instance, longitudinal and vertical members $b'$ serving to form rectangular openings $b^2$.

Each panel $b$ has mounted, rearwardly thereof, a dust filter $c$ which may be formed with side supporting members $c'$ having apertures $c^2$ by means of which the filters may be applied to the respective panels $b$. The filter section $c$ is formed from a metallic mesh or screen element having corrugations $c^3$. In the form shown, these corrugations are longitudinal, thus permitting the extension of the screen element in a vertical direction to enable it to be used with grating sections of varying sizes. It will be understood, of course, that the specific type of corrugation or fluting may be varied. By means of the corrugations, the superficial filtering surface is materially increased and the obstruction to the flow of air by such filtering device rendered almost negligible.

Figure 4 shows the manner in which air circulates through the radiator cabinet, the arrows indicating a flow of air into the cabinet at the lower portion thereof and out through the screen element after having been heated by the radiator coils. By forming the filter, or screening element, of metal, the effectiveness of the radiator is not impaired and the resulting structure provides an effective filtering out of the dust particles in the heated air, at the same time permitting the radiator to function in a normal fashion.

While the invention has been described with specific reference to the accompanying drawings, it is not to be limited, save as defined in the appended claim.

I claim as my invention:

In combination with a radiator cover having an aperture through which heated air passes, a dust screen formed with corrugations to filter dust particles from the heated air, supporting means carried by the cover upon opposite sides of the aperture and forming grooves into which the sides of the screen transverse to the corrugations are extensibly received, and a grating mounted in the grooves of the supporting means and positioned against the dust screen.

This specification signed this 4th day of November, A. D. 1929.

RICHARD H. WARD.